(12) United States Patent
Akutsu et al.

(10) Patent No.: US 11,486,887 B2
(45) Date of Patent: Nov. 1, 2022

(54) AUTOMATED ANALYZER

(71) Applicant: Hitachi High-Tech Corporation, Tokyo (JP)

(72) Inventors: Masashi Akutsu, Tokyo (JP); Akihisa Makino, Tokyo (JP); Hiroyuki Mishima, Tokyo (JP); Akihiro Yasui, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 234 days.

(21) Appl. No.: 16/468,761

(22) PCT Filed: Nov. 13, 2017

(86) PCT No.: PCT/JP2017/040745
§ 371 (c)(1),
(2) Date: Jun. 12, 2019

(87) PCT Pub. No.: WO2018/116694
PCT Pub. Date: Jun. 28, 2018

(65) Prior Publication Data
US 2019/0317119 A1    Oct. 17, 2019

(30) Foreign Application Priority Data
Dec. 19, 2016  (JP) .............................. JP2016-245769

(51) Int. Cl.
*G01N 35/04* (2006.01)
*G01N 35/00* (2006.01)
*G01N 35/02* (2006.01)

(52) U.S. Cl.
CPC ......... *G01N 35/04* (2013.01); *G01N 35/0095* (2013.01); *G01N 35/00732* (2013.01);
(Continued)

(58) Field of Classification Search
CPC .. G01N 35/04; G01N 35/0095; G01N 35/026; G01N 2035/00752;
(Continued)

(56) References Cited

U.S. PATENT DOCUMENTS 6,117,683 A     9/2000  Kodama et al.
7,842,237 B1 *  11/2010 Shibuya ............... G01N 35/026
                                                       422/65
(Continued)

FOREIGN PATENT DOCUMENTS

JP        9-43248 A      2/1997
JP        9-281113 A    10/1997
(Continued)

OTHER PUBLICATIONS

International Preliminary Report on Patentability (PCT/IB/338 & PCT/IPEA/409) issued in PCT Application No. PCT/JP2017/040745 dated Jun. 20, 2019 (eight (8) pages).
(Continued)

*Primary Examiner* — Jill A Warden
*Assistant Examiner* — John McGuirk
(74) *Attorney, Agent, or Firm* — Crowell & Moring LLP

(57) ABSTRACT

The present invention is provided with a sample rack insertion unit 12 that is capable of holding one or more sample racks 5 having mounted therein one or more sample containers 6 accommodating a sample to be analyzed, one or more analysis devices 2, 3 for analyzing the sample accommodated in the sample containers 6, a sample rack conveyance unit 14 for conveying the sample racks 5 from the sample rack insertion unit 12 to the analysis devices 2, 3, and a control device 4 for acquiring, for each analysis device 2, 3, load information that is information expressing an operating condition of the analysis device 2, 3, and, if there is an analysis device 2, 3 for which the load information is larger than a predetermined conveyance permission value, carrying out control so as to stop the conveyance of the sample racks 5 from the sample rack insertion unit 12 to the analysis device(s) 2, 3. As a result of this configuration, it is possible to mitigate in-device sample conveyance congestion occurring as a result of the insertion of many samples and keep the sample environment and analysis processing power at high levels.

3 Claims, 7 Drawing Sheets

(52) U.S. Cl.
CPC ....... *G01N 35/026* (2013.01); *G01N 35/0092* (2013.01); *G01N 2035/0094* (2013.01); *G01N 2035/00752* (2013.01); *G01N 2035/0496* (2013.01)

(58) Field of Classification Search
CPC ... G01N 2035/0496; G01N 2035/0094; G01N 2035/0412; G01N 35/0092; G01N 35/02; G01N 2035/0462
See application file for complete search history.

(56) References Cited

U.S. PATENT DOCUMENTS

| | | | |
|---|---|---|---|
| 2004/0186360 A1* | 9/2004 | Suzuki | G01N 35/026 600/310 |
| 2004/0208787 A1* | 10/2004 | Takahashi | G01N 35/02 422/64 |
| 2009/0162247 A1 | 6/2009 | Tokieda et al. | |
| 2011/0160899 A1* | 6/2011 | Tatsutani | G01N 35/04 700/218 |
| 2014/0170023 A1 | 6/2014 | Saito et al. | |
| 2014/0363259 A1* | 12/2014 | Lorenzen | G01N 35/04 414/222.01 |
| 2016/0061851 A1 | 3/2016 | Yamakawa et al. | |

FOREIGN PATENT DOCUMENTS

| | | |
|---|---|---|
| JP | 11-64342 A | 3/1999 |
| JP | 2000-88860 A | 3/2000 |
| JP | 2002-357612 A | 12/2002 |
| JP | 2003-57251 A | 2/2003 |
| JP | 2008-39552 A | 2/2008 |
| JP | 2009-150859 A | 7/2009 |
| JP | 2014-62760 A | 4/2014 |
| JP | 2016-50934 A | 4/2016 |
| WO | WO 2013/035418 A1 | 3/2013 |

OTHER PUBLICATIONS

International Search Report (PCT/ISA/210) issued in PCT Application No. PCT/JP2017/040745 dated Feb. 13, 2018 with English translation (five (5) pages).

Japanese-language Written Opinion (PCT/ISA/237) issued in PCT Application No. PCT/JP2017/040745 dated Feb. 13, 2018 (four (4) pages).

* cited by examiner

[FIG. 1]
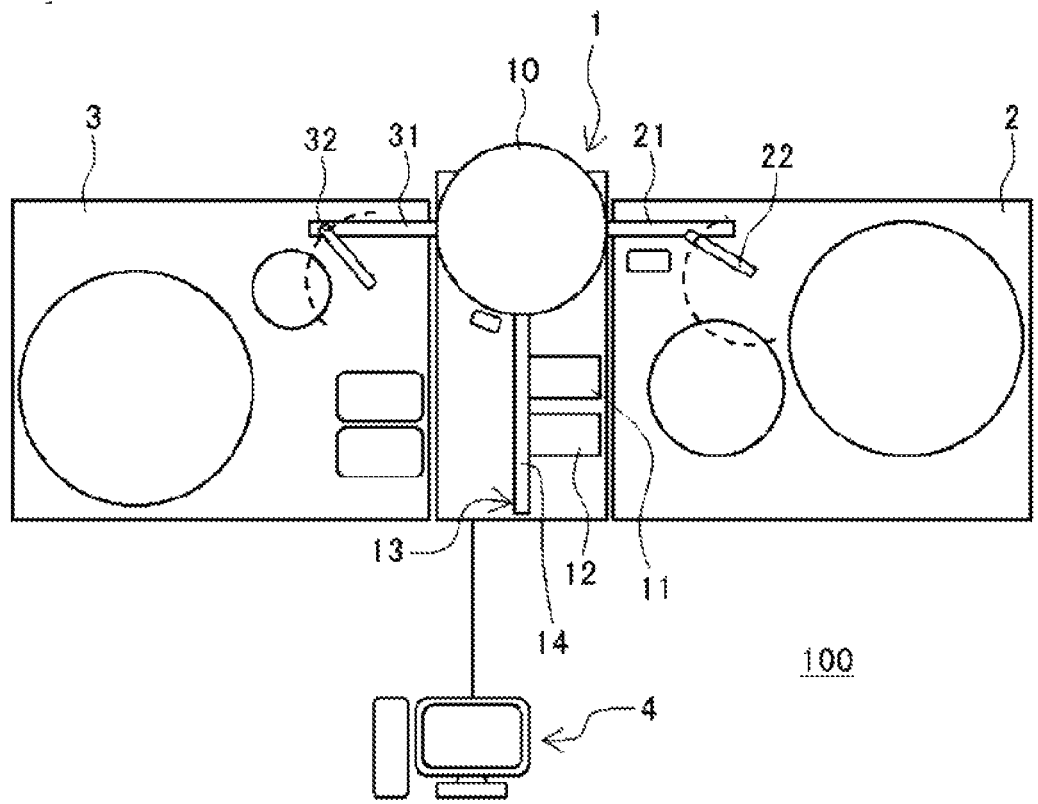
[FIG. 2]
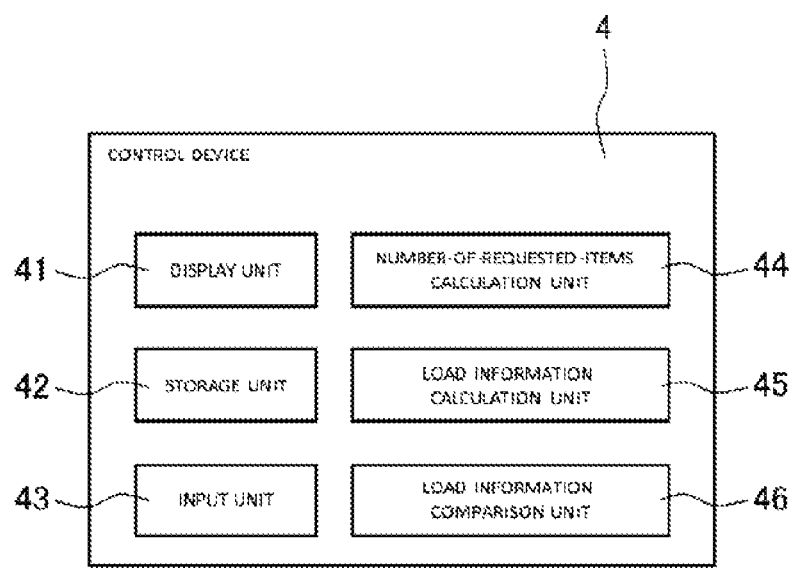

[FIG. 3]
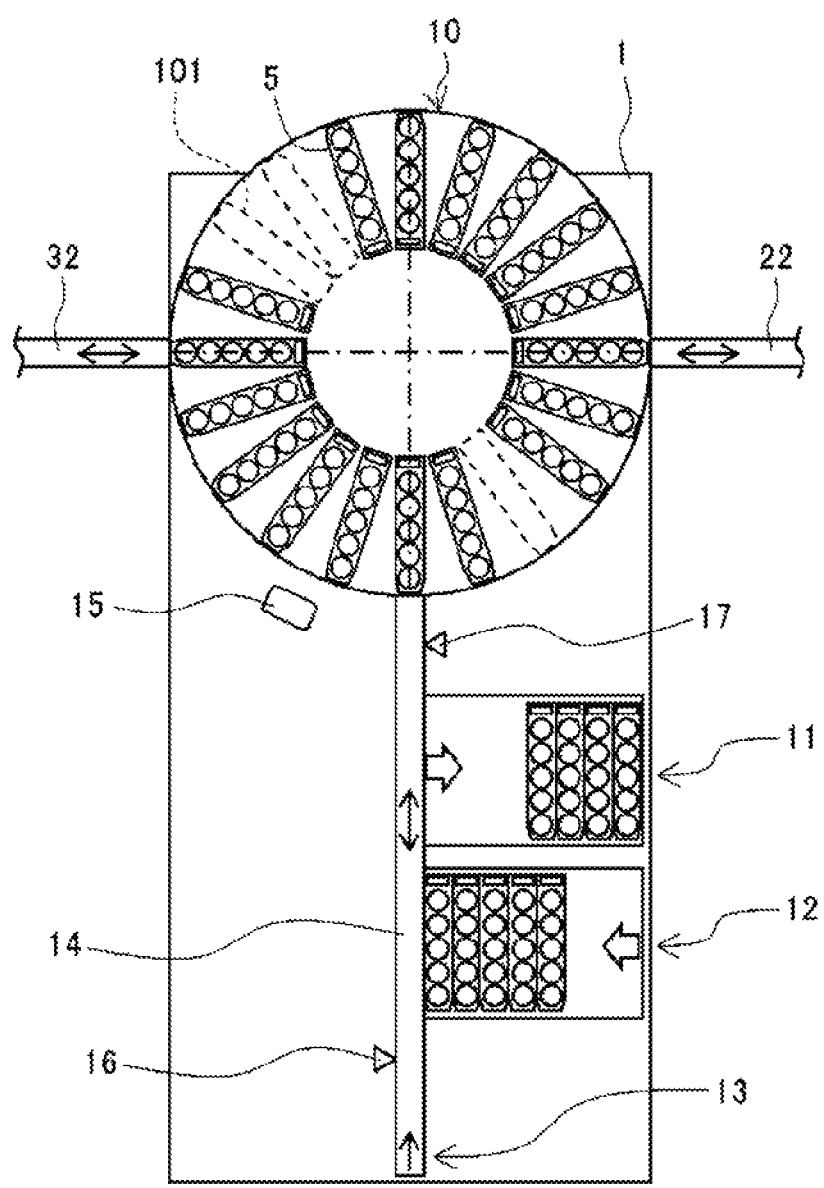

[FIG. 4]
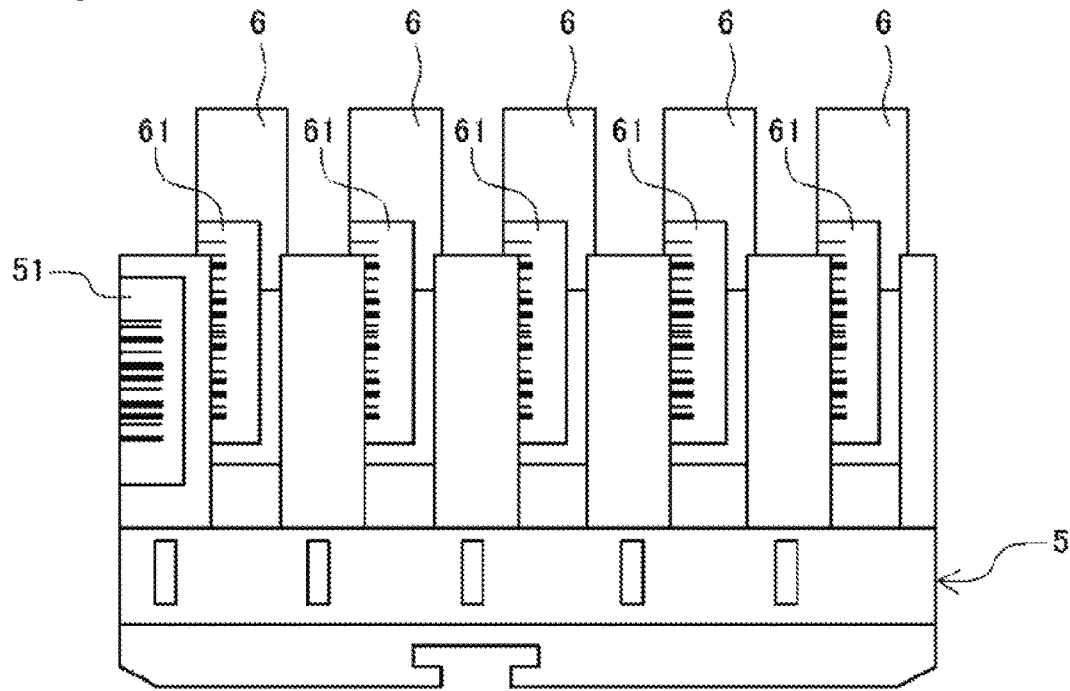
[FIG. 5]
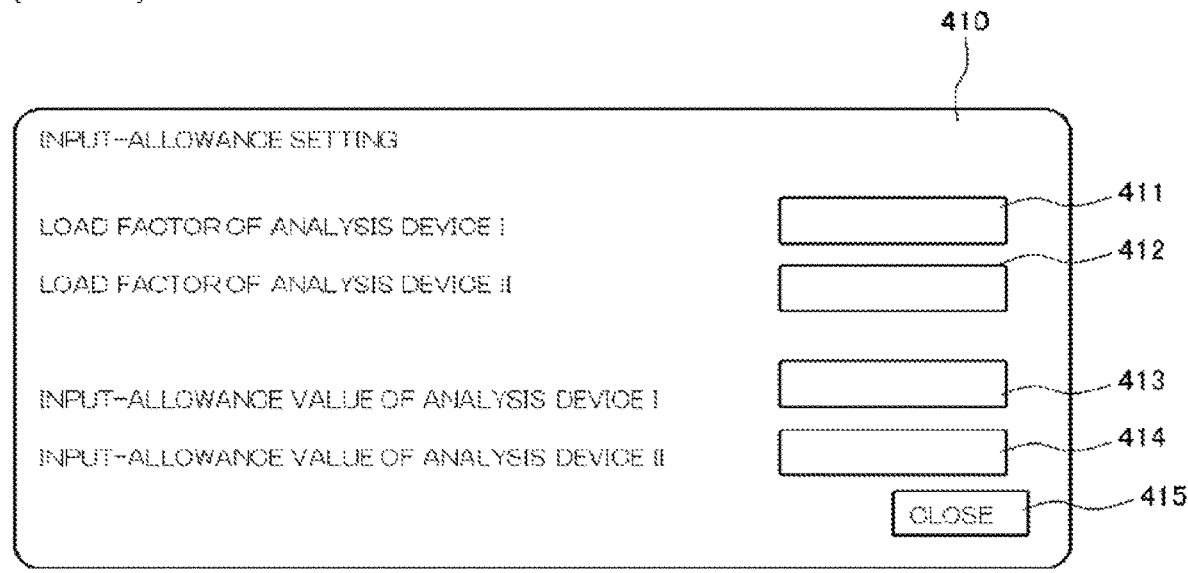

[FIG. 6]
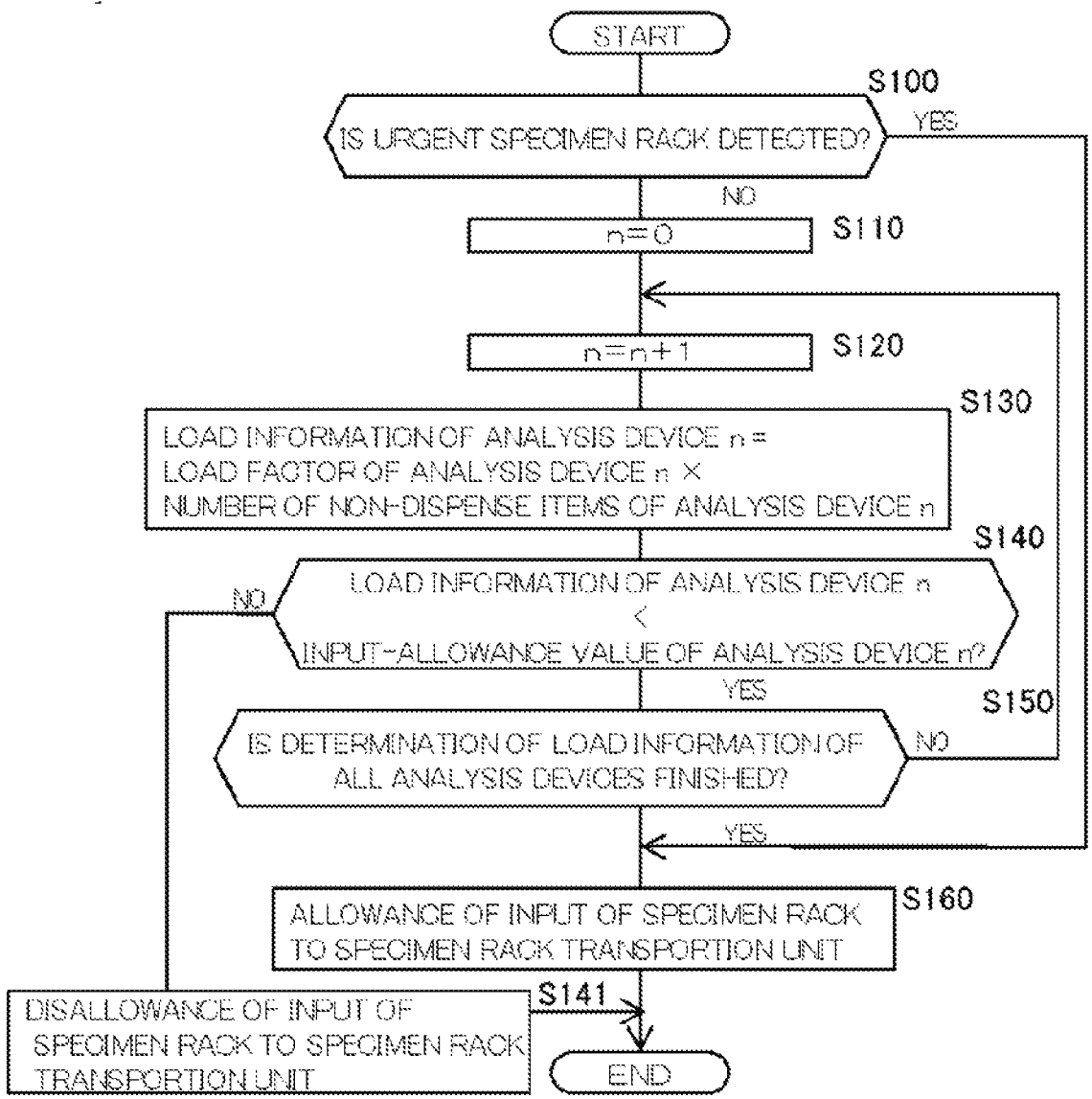

[FIG. 7]
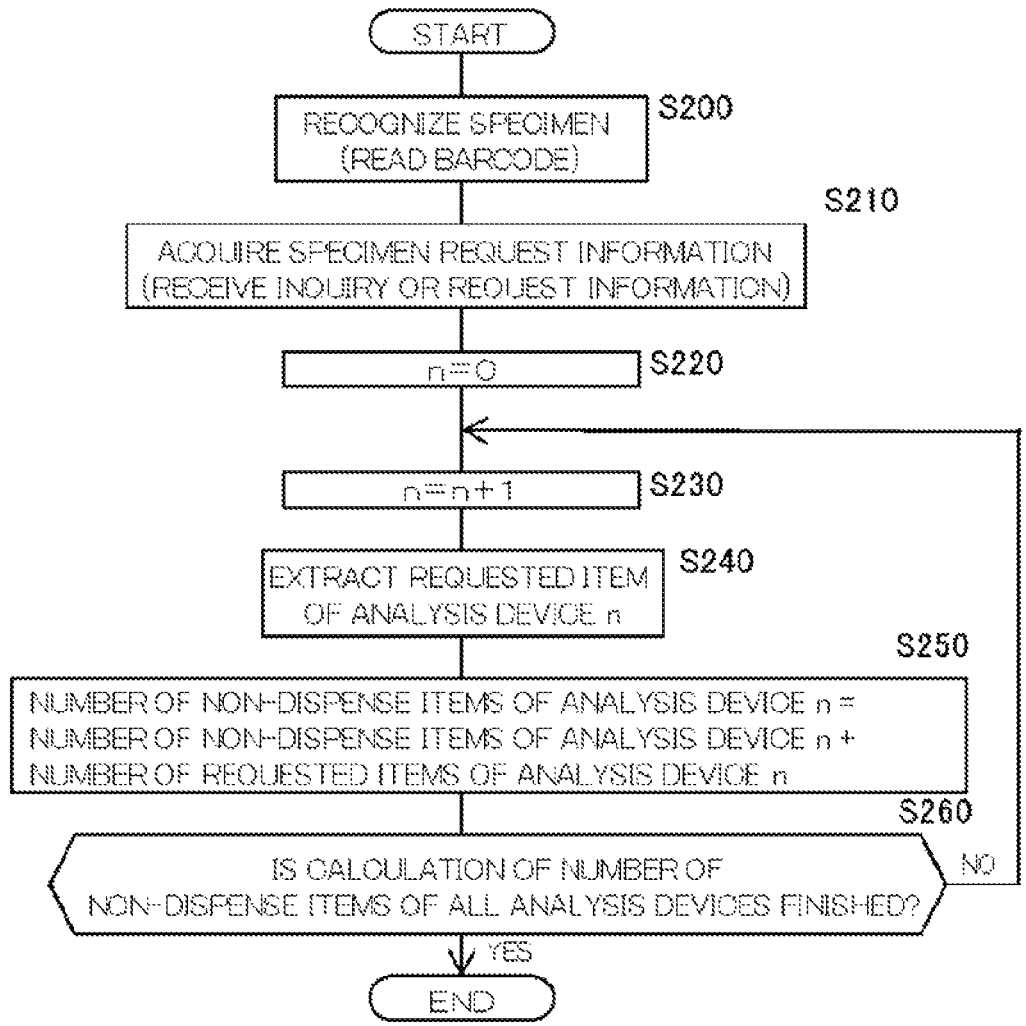
[FIG. 8]
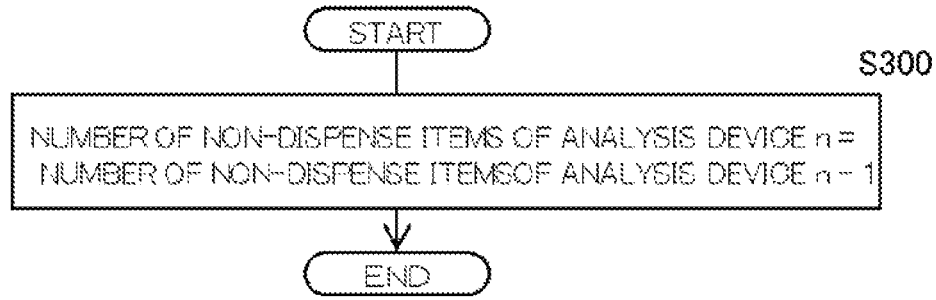

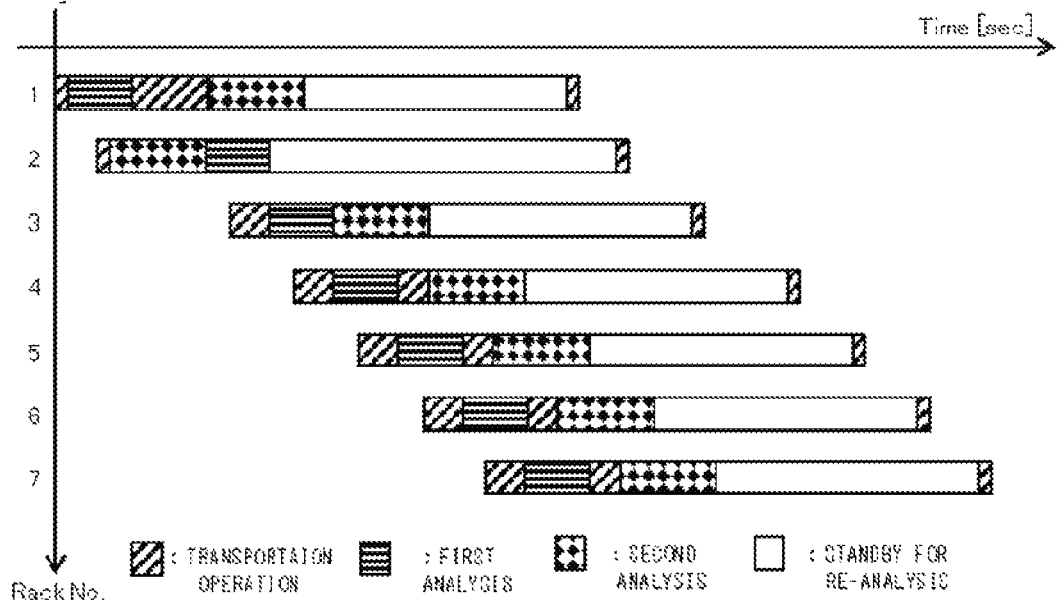
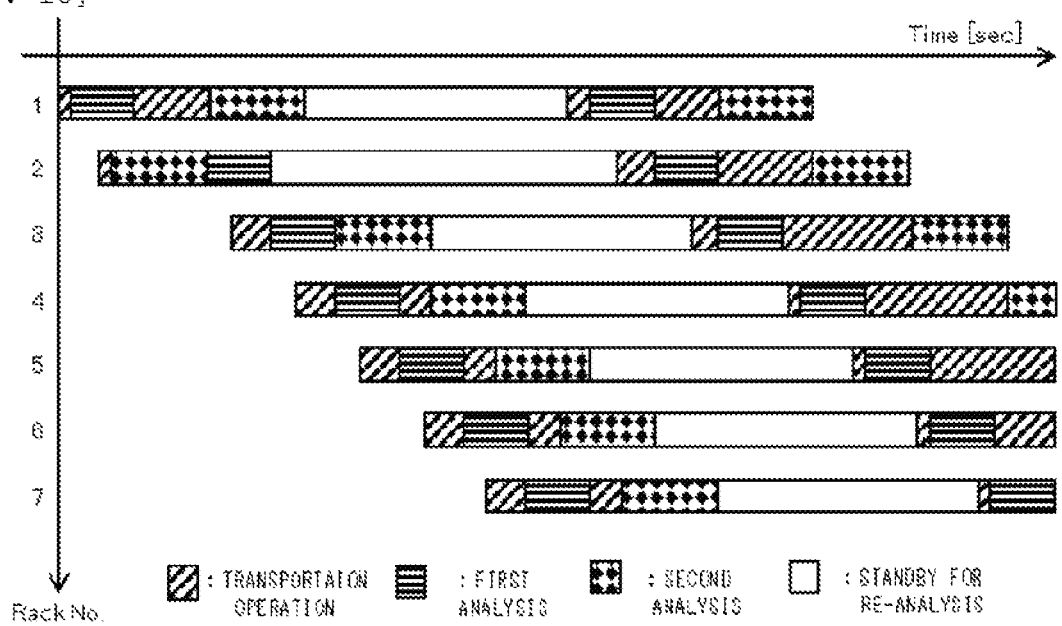

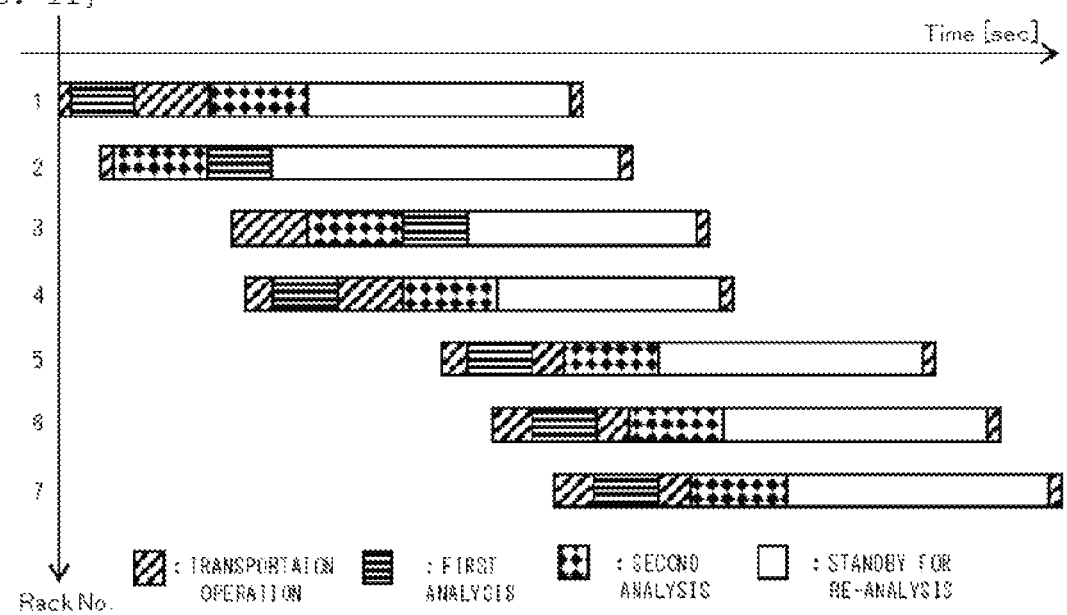

AUTOMATED ANALYZER

TECHNICAL FIELD

The present invention relates to an automatic analysis device that performs qualitative and quantitative analysis of biological samples such as blood and urine.

BACKGROUND ART

An automatic analysis device that performs qualitative and quantitative analysis of biological samples (hereinafter, referred to as "specimens") such as blood and urine can disperse a lot of specimens within a short period of time. Therefore, the use of the automatic analysis device significantly increases mainly in major hospitals or clinical examination centers where a lot of patient specimens are treated, and an automatic analysis device that automatically performs from transportation of a specimen rack up to an analysis process by an analysis device simply by mounting a specimen container containing a specimen (biological sample) on the specimen rack and inputting the specimen rack into an input port is also widely used.

An automatic analysis device that can perform a wide variety of analysis processes by including multiple different kinds of analysis devices has been put into practice. For example, JP-A-2014-062760 (PTL 1) discloses an automatic specimen transportation system that distributes specimens into a plurality of analyzers capable of simultaneously measuring a lot of items. This automatic specimen transportation system includes: means for checking measurement items of specimens; means for determining a processing capacity of each of a plurality of analyzers at the time; and means for distributing the checked measurement items of the specimens to the analyzers according to the processing capacity of each of the analyzers at the time.

CITATION LIST

Patent Literature

PTL 1: JP-A-2014-062760

SUMMARY OF INVENTION

Technical Problem

However, the number of analysis targets such as patient specimens to be treated in facilities such as major hospitals or clinical examination centers is not constant, and analysis processes of a lot of specimens may be requested at once. In this case, in the related art, analysis requests may concentrate on one analysis device depending on analysis items required for each specimen, and the transportation of specimens standing by for processes in a device is congested such that non-processed specimens are left to stand on a transportation line for a long period of time. However, it cannot be said that this state is in a good environment because the specimens as analysis targets may undergo drying or a temperature change, and there is also a concern regarding, for example, modification of the specimen or influence on an analysis result.

The invention has been made in consideration of the above-described circumstances, an object thereof is to provide an automatic analysis device which can relieve congestion of specimen transportation in a device which is caused by inputting a lot of specimens, and can maintain specimen environment or analysis processing capacity at a high level.

Solution to Problem

In order to achieve the objects, according to the invention, there is provided an automatic analysis device including: a specimen rack input unit which can hold one or more specimen racks on which one or more specimen containers each containing a specimen as an analysis target are mounted; one or more analysis units which analyze the specimen contained in the specimen container; a specimen rack transportation unit which transports the specimen rack between the specimen rack input unit and the analysis unit; and a control unit which performs control such that the transportation of the specimen rack from the specimen rack input unit to the analysis unit is stopped in a case where load information as information representing an operation status of the analysis unit is acquired for each analysis unit and there is an analysis unit of which the load information is greater than a predetermined set value.

Advantageous Effects of Invention

The congestion of the specimen transportation in a device which is caused by inputting a lot of specimens can be relieved, and the specimen environment or the analysis processing capacity can be maintained at a high level.

BRIEF DESCRIPTION OF DRAWINGS

FIG. 1 is a diagram schematically illustrating the entire configuration of an automatic analysis device according to an embodiment of the invention.

FIG. 2 is a functional block diagram illustrating a control device of the automatic analysis device.

FIG. 3 is a diagram illustrating a sampler device of the automatic analysis device in detail.

FIG. 4 is a diagram illustrating an example of a specimen rack on which specimen containers are mounted.

FIG. 5 is a diagram illustrating an input-allowance setting screen displayed on a display unit.

FIG. 6 is a flowchart illustrating the entirety of a transportation control process.

FIG. 7 is a flowchart illustrating a calculation process of the number of non-dispense items.

FIG. 8 is a flowchart illustrating a calculation process of the number of non-dispense items.

FIG. 9 is a diagram illustrating a simulation result of a specimen transportation process in an automatic analysis device to which the invention is applied.

FIG. 10 is a diagram illustrating a simulation result of the specimen transportation process in the automatic analysis device to which the invention is applied.

FIG. 11 is a diagram illustrating a simulation result of the specimen transportation process in the automatic analysis device to which the invention is applied.

DESCRIPTION OF EMBODIMENTS

Hereinafter, one embodiments of the invention will be described with reference to the drawings.

FIG. 1 is a diagram schematically illustrating the entire configuration of an automatic analysis device according to the embodiment of the invention. FIG. 4 is a diagram illustrating an example of a specimen rack on which specimen containers are mounted.

In FIGS. 1 and 4, roughly, the automatic analysis device 100 includes: a sampler device 1 that performs the input and collection of a specimen rack 5, on which one or more (in the embodiment, five) specimen containers 6 are mounted, to and from the automatic analysis device 100 and the transportation of the specimen rack 5 in the automatic analysis device 100, each of the specimen containers 6 containing a biological sample (hereinafter, referred to as "specimen") such as blood or urine as an analysis target; and one or more (in the embodiment, two) analysis devices 2 and 3 (analysis units) that are connected to the sampler device 1; and a control device 4 (control unit) that controls the entire operation of the automatic analysis device 100.

A barcode 51 as an identification tag is attached to the specimen rack 5 input to the automatic analysis device 100. A barcode 61 as an identification tag is also attached to each of the specimen containers 6 mounted on the specimen rack 5. The specimen containers 6 in a stopper-opened state (state where a member such as a rubber stopper in an opening portion is removed) are mounted on the specimen rack 5.

FIG. 3 is a diagram illustrating the sampler device of the automatic analysis device in detail.

In FIG. 3, the sampler device 1 includes: a specimen rack transportation unit 14 that bidirectionally transports the specimen rack 5; a specimen rack buffer unit 10 that is arranged in one end of the specimen rack transportation unit 14; an urgent specimen rack input unit 13 that is arranged in another end of the specimen rack transportation unit 14; a specimen rack input unit that is arranged in the middle of the specimen rack transportation unit 14; and a specimen rack storage unit 11 that is arranged on the specimen rack buffer unit 10 side of the specimen rack input unit 12 in the middle of the specimen rack transportation unit 14.

The specimen rack transportation unit 14 is configured by, for example, a belt conveyor or a transportation mechanism including a pawl and a guide member that is driven in a transportation direction, and is configured as a single path through which the specimen rack 5 can be transported in two directions.

The specimen rack input unit 12 is provided for an operator to input the specimen rack 5 on which the specimen containers 6 are mounted to the automatic analysis device 100, and has a function of holding the specimen racks 5 in an environment (for example, an environment where a temperature, a humidity, or the like is appropriate) that is appropriate for the specimens. The specimen rack 5 input to the specimen rack input unit 12 by the operator is appropriately output to the specimen rack transportation unit 14 side according to a transportation control process (described below) by the control device 4 and is transported.

The specimen rack storage unit 11 is provided to hold the specimen racks 5 that are processed in the automatic analysis device 100 and for the operator to collect the specimen rack 5 (extract the specimen rack 5 from the automatic analysis device 100), and the specimen rack 5 transported to the specimen rack transportation unit 14 is appropriately taken into the specimen rack storage unit 11 according to the transportation control process (described below) by the control device 4.

The urgent specimen rack input unit 13 is provided for the operator to input the specimen rack 5 on which the specimen containers 6 containing urgent specimens (specimens that require an urgent analysis process) are mounted to the automatic analysis device 100. In the urgent specimen rack input unit 13, an urgent specimen rack detection sensor 16 that detects the input of the specimen rack 5 is arranged.

The specimen rack buffer unit 10 has a disk shape that is provided to rotate in a circumferential direction, and is arranged such that an outer circumference of the specimen rack buffer unit 10 and an end portion of the specimen rack transportation unit 14 are adjacent to and face each other. The specimen rack buffer unit 10 includes a plurality of specimen rack holding unit 101 that are arranged in the circumferential direction, and is configured so as to transport the specimen rack 5 from and to the specimen rack transportation unit 14. The specimen rack buffer unit 10 having the above-described configuration can input the specimen rack 5, which has been transported by the transportation mechanism (for example, the specimen rack transportation unit 14 and analysis device specimen rack pulling-in lines 21 and 31 (described below)), to an arbitrary specimen rack holding unit 101 (empty) or can output an arbitrary specimen rack 5 held in the specimen rack holding unit 101 to the transportation mechanism. The embodiment describes the case where, among all of the specimen rack holding units 101, only three are empty and the others hold the specimen racks 5.

In an end portion of the specimen rack transportation unit 14 on the specimen rack buffer unit 10 side, an specimen presence/absence determination sensor 17 and a specimen barcode reader 15 are arranged, the specimen presence/absence determination sensor 17 acquiring a mounting state (information regarding the presence/absence or mounting positions of the specimen containers 6) of the specimen containers 6 on the transported specimen rack 5, and the specimen barcode reader 15 reading the barcode 51 attached to the specimen rack 5 and the barcodes 61 attached to the specimen containers 6. Identification information read by the specimen barcode reader 15 is transmitted to the control device 4, and a correspondence between a specimen and a patient is specified (checked) based on the identification information.

A plurality of analysis devices can be arranged at positions adjacent to the specimen rack buffer unit 10 of the sampler device 1 in a direction different from the specimen rack transportation unit 14. The embodiment describes the case where, when the specimen rack buffer unit 10 side is seen from the specimen rack transportation unit 14, the analysis device 2 (analysis unit) is arranged on the right side (on the right side in FIGS. 1 and 3) of the specimen rack buffer unit 10 and the analysis device 3 (analysis unit) is arranged on the left side (on the left side in FIGS. 1 and 3) of the specimen rack buffer unit 10.

In the analysis devices 2 and 3, the analysis device specimen rack pulling-in lines 21 and 31 for pulling in the specimen racks held in the specimen rack buffer unit 10 are arranged, respectively, such that the outer circumference of the specimen rack buffer unit 10 and end portions of the analysis device specimen rack pulling-in lines 21 and 31 on the specimen rack buffer unit 10 side are adjacent to and face each other. In the analysis device specimen rack pulling-in lines 21 and 31, specimen dispensing mechanisms 22 and 32 that dispense the specimens of the specimen container 6 into reaction cells (not illustrated) in the analysis devices 2 and 3 are arranged in order to provide the specimens for analysis processes in the analysis devices 2 and 3. A reagent corresponding to a requested item (analysis items) is added to each of the specimens dispensed into the reaction cells or the like of the analysis devices 2 and 3 such that transmitted light, scattered light, a colorimetric reaction, or the like is measured using a photometry function. It can be said that the specimen rack transportation unit 14 and the analysis device specimen rack pulling-in lines 21 and 31 configure a specimen rack transportation unit that transports the specimen rack 5 between the specimen rack input unit 12 and the analysis units (analysis devices 2 and 3).

The analysis devices 2 and 3 are configured by an analysis device for a biological examination or an analysis device for an immunological examination, and a case where the analysis devices 2 and 3 are different from each other in the examination object or the processing capacity, a case where the analysis devices 2 and 3 are configured by the same analysis device and are different from each other in the examination object (examination item), a case where the analysis devices 2 and 3 are configured by the same analysis device and have the same examination object (examination item) to maintain the processing capacity, or the like can be considered.

FIG. 2 is a functional block diagram illustrating the control device of the automatic analysis device.

In FIG. 2, the control device 4 includes: a display unit 41 that displays information regarding various setting screens, an analysis result, and the like; a storage unit 42 that stores various programs, various parameters used for an analysis process, an analysis result, and the like; and an input unit 43 through which the operator inputs various parameters, commands, and the like used for an analysis process. As functional units used for the transportation control process, the control device 4 includes: a number-of-requested-items calculation unit 44 that calculates the number of analysis items (requested items) for each of the analysis devices 2 and 3, the number of analysis items being set for each of the specimen containers 6 mounted on the specimen racks 5 (including the specimen racks 5 that are scheduled to be pulled in) pulled into the analysis device specimen rack pulling-in lines 21 and 31; a load information calculation unit 45 that calculates load information as information representing an operation status of the analysis devices 2 and 3 for each of the analysis devices 2 and 3; and a load information comparison unit 46 that compares the calculation result (load information) obtained by the load information calculation unit 45 with a predetermined input-allowance value (set value) for each of the analysis devices 2 and 3.

Here, the load information relates to a process (that is, for example, a dispensing process) required to input each of the samples to each of the analysis devices 2 and 3 and, in the embodiment, is obtained by the product of the number of items (non-dispense items) which are not dispensed among the number of analysis items set for the specimens contained in the specimen container 6 and a time (load factor) which is required to perform a dispensing process of the specimens.

In the embodiment, in a case where the load information is acquired for each of the analysis units 2 and 3 and there is an analysis device of which the load information is greater than the input-allowance value, the transportation control process is performed such that the transportation of the specimen rack 5 from the specimen rack input unit 12 to the specimen rack transportation unit 14 (in other words, the transportation of the specimen rack 5 from the specimen rack input unit 12 to the analysis devices 2 and 3) is stopped.

FIG. 5 is a diagram illustrating an input-allowance setting screen displayed on the display unit.

In FIG. 5, on the input-allowance setting screen 410, an analysis device I load factor input unit 411 and an analysis device I input-allowance value input unit 413 for inputting a load factor and an input-allowance value of an analysis device (for example, the analysis device 2) registered as an analysis device I, an analysis device II load factor input unit 412 and an analysis device II input-allowance value input unit 414 for inputting a load factor and an input-allowance value of an analysis device (for example, the analysis device 3) registered as an analysis device II, and a CLOSE button 415 that fixes the contents input to the input-allowance setting screen 410 and closes the screen are arranged.

The embodiment describes the case where the operator inputs a numerical value of the input-allowance value. However, a frequency at which the specimen rack 5 is input to (or is stopped at) the specimen rack transportation unit 14 may be configured to be able to be selectively set according to a usage environment of the automatic analysis device 100 while monitoring an operation state such that the input-allowance value is automatically determined based on the selected setting. The embodiment describes the case where the operator inputs a numerical value of the load factor. However, as in the case of the input-allowance value, the frequency may be configured to be able to be selectively set such that the load factor is automatically determined based on the selected setting. It is presumed that the load factor changes depending on an operation state of the specimen dispensing mechanisms 22 and 32. For example, in a case where a cleaning process (for example, a cleaning process using a special cleaning solution or a cleaning process of performing cleaning with care for a longer period of time) different from a typical cleaning process is scheduled for the specimen dispensing mechanism 22 and 32, the corresponding time is calculated as the load factor. In a case where it is necessary to dispense a specimen in an amount exceeding the amount of the specimen that can be dispensed in one dispensing process, it is necessary to perform the dispensing process multiple times according to one item. Therefore, the corresponding time is calculated as the load factor.

FIGS. 6 to 8 are flowcharts illustrating processes relating to the transportation control process of the control device. FIG. 6 is a flowchart illustrating the entirety of the transportation control process. FIGS. 7 and 8 are flowcharts illustrating a calculation process of the number of non-dispense items.

The transportation control process according to the embodiment is characterized in that 1 is subtracted from the number of non-processed items in each of the analysis devices 2 and 3 (that is, the number of times of dispensing to be performed by each of the analysis devices 2 and 3) per completion of dispensing while monitoring the number of non-processed items, the obtained value is multiplied by the load factor of each of the analysis devices to calculate a continuous processing time (that is, the load information), and the calculated processing time is managed.

In FIG. 6, the control device 4 determines whether or not the specimen rack 5 is input to the urgent specimen rack input unit 13 and is detected by the urgent specimen rack detection sensor 16 (Step S100). In a case where the determination result is YES, the control device 4 allows the input of the specimen rack 5 to the specimen rack transportation unit 14 regardless of the magnitude between the input-allowance value and the load information, transports the specimen rack 5 input to the urgent specimen rack input unit 13 to the specimen rack buffer unit 10 through the specimen rack transportation unit 14 (Step S160), and ends the process.

In a case where the determination result in Step S100 is NO, the control device 4 sets 0 (zero) to a variation n to be reset (Step S110) and sets the variation n=n+1 (Step S120). Here, the control device 4 selects an arbitrary n-th (to begin with, first) analysis device n from the analysis devices connected to the automatic analysis device 100, and sets the product of a load factor of the analysis device n and the number of non-dispense items of the analysis device n as load information of the analysis device n (Step S130). Next, the control device 4 compares the load information of the analysis device n with an input-allowance value to determine whether or not the input-allowance value is greater than the load information (Step S140). In a case where the determination result in Step S140 is YES, the control device 4 determines whether the load information determination (the determination in Step S140) of all the analysis devices ends (Step S150). In a case where the determination result is NO, the control device 4 repeats Steps S120 to S140 until the load information determination of all the analysis devices ends (in the embodiment, until the load information determination of n=2 ends). In a case where the determination result in Step S150 is YES, in other words, in a case where the results of the load information determination of all the analysis devices 2 and 3 connected to the automatic analysis device 100 are YES, the control device 4 allows the input of one specimen rack 5 from the specimen rack input unit 12 to the specimen rack transportation unit 14, transports the specimen rack 5 input to the urgent specimen rack input unit 13 to the specimen rack buffer unit 10 through the specimen rack transportation unit (Step S160), and ends the process. In a case where the determination result in Step S140 is NO, in other words, in a case where the result of the load information determination of at least one analysis device is NO, the control device 4 disallows the input of one specimen rack 5 from the specimen rack input unit 12 to the specimen rack transportation unit 14 (Step S141), and ends the process.

In FIG. 7, when the specimen rack 5 is transported up to an end portion of the specimen rack transportation unit 14 on the specimen rack buffer unit 10 side, the control device 4 recognizes the specimens of the specimen rack 5 and the specimen container (reads the barcodes 51 and 61) (Step S200) and inquires an upper-level host (not illustrated) about specimen request information based on the read specimen information to acquire the information (Step S210). The embodiment describes the case where the control device 4 inquires the upper-level host about the specimen request information. However, the control device 4 may be configured to store the specimen request information in the storage unit 42 and to read the stored request information.

Next, the control device 4 sets 0 (zero) to a variation n to be reset (Step S220) and sets the variation n=n+1 (Step S230). Here, the control device 4 selects an arbitrary n-th (to begin with, first) analysis device n from the analysis devices connected to the automatic analysis device 100, extracts requested items of the analysis device n from the specimen request information (Step S240), and sets, as the number of non-dispense items of the analysis device n, the sum of the current number of non-dispense items in the analysis device n (the number of non-dispense items in the specimen containers 6 of the specimen rack 5 where the dispensing process is performed by the analysis device specimen rack pulling-in lines 21 and 31) and the number of requested items of the analysis device n (the number of analysis items of the specimen containers 6 of which the identification information is read by the specimen barcode reader 15) (Step S250). Next, the control device 4 determines whether or not the calculation of the number of non-dispense items is finished for each of the analysis device 2 and 3 connected to the automatic analysis device 100 (Step S260). In a case where the determination result is NO, the control device 4 repeats Steps S230 to S250 until the determination result becomes YES. In a case where the determination result in Step S260 is YES, the control device 4 ends the process.

In FIG. 7, the control device 4 subtracts 1 from the number of non-dispense items of the analysis device n per completion of the dispensing process in the specimen dispensing mechanisms 22 and 32 and the analysis devices 2 and 3 (Step S300).

The operation of the embodiment having the above-described configuration will be described.

When the specimen rack 5 on which the specimen containers 6 are mounted is loaded to the specimen rack input unit 12 to start analysis, in a case where the input of the specimen rack 5 to the specimen rack transportation unit 14 is allowed, the specimen rack 5 is pulled into the specimen rack buffer unit 10 through the specimen rack transportation unit 14. The specimen rack 5 is transported to any one of the analysis device specimen rack pulling-in lines 21 and 31 of the analysis devices 2 and 3 according to the requested item, and the specimens contained in the specimen containers 6 are dispensed by the specimen dispensing mechanisms 22 and 32. The specimen rack 5 of which the dispensing process ends is transported from the analysis device specimen rack pulling-in lines 21 and 31 in the opposite direction, returns to the specimen rack buffer unit 10, and is finally collected to the specimen rack storage unit 11 through the specimen rack transportation unit 14. The specimen rack 5 of which the dispensing process ends in the analysis devices 2 and 3 may stand by in the specimen rack buffer unit 10 until the measurement result is output such that a process such as automatic re-analysis or the like is optionally performed. In a case where the input of the specimen rack 5 from the specimen rack input unit 12 to the specimen rack transportation unit 14 is disallowed, the specimen rack 5 stands by as it is until the input is allowed. In the urgent specimen rack input unit 13 to which one specimen rack 5 on which the specimen container 6 containing an urgent specimen is mounted can be input, when the specimen rack 5 that needs to be urgently measured is loaded, the specimen rack 5 can be input to the specimen rack buffer unit 10 prior to the racks loaded to the specimen rack input unit 12 regardless of the allowance of the input.

The effects of the embodiment having the above-described configuration will be described.

The number of analysis targets such as patient specimens to be treated in facilities such as major hospitals or clinical examination centers is not constant, and analysis processes of a lot of specimens may be requested at once. In this case, in the related art, analysis requests may concentrate on one analysis device depending on analysis items required for each specimen, and transportation of specimens standing by for a process in a device is congested such that non-processed specimens are left to stand on a transportation line for a long period of time. However, it cannot be said that this state is in a good environment because the specimens as analysis targets may undergo drying or a temperature change, and there is also a concern regarding, for example, modification of the specimen or influence on an analysis result.

On the other hand, the automatic analysis device 100 according to the embodiment includes: a specimen rack input unit 12 which can hold one or more specimen racks 5 on which one or more specimen containers 6 each containing a specimen as an analysis target are mounted; one or more analysis units 2 and 3 which analyze the specimen contained in the specimen container 6; a specimen rack transportation unit 14 which transports the specimen rack 5 from the specimen rack input unit 12 to the analysis units 2 and 3; and a control device 4 which performs control such that the transportation of the specimen rack 5 from the specimen rack input unit 12 to the analysis unit 2 or 3 is stopped in a case where load information as information representing an operation status of the analysis units 2 and 3 is acquired for each of the analysis units 2 and 3 and there is an analysis unit 2 or 3 of which the load information is greater than an input-allowance value. Therefore, the congestion of the specimen transportation in a device which is caused by inputting a lot of specimens can be relieved, and the specimen environment or the analysis processing capacity can be maintained at a high level.

In particular, in the related art, in a case where analysis processes of a lot of specimens are requested, TAT (turn around time) increases. TAT of a device refers to the time required for the device to output a measurement result after recognizing a specimen (reading a barcode attached to a specimen container). Therefore, in a case where a specimen is non-processed for a long period of time even after being input to a device, TAT increases. Even when an urgent process in another analysis device is requested in this state, once a specimen is input to the device, it is difficult to extract the specimen from the device.

In the embodiment, in a case where at least one analysis device having a high load is present, the input of the specimen rack 5 to the specimen rack transportation unit 14 is disallowed to prevent the input such that the excessive congestion in the automatic analysis device 100 can be avoided. On the other hand, in a case where it is determined that the loads of all the analysis devices 2 and 3 are low, the input of the specimen rack 5 to the specimen rack transportation unit 14 is allowed such that the processing capacity of the analyzing unit can be maintained. In a case where the specimen rack 5 on which the specimen container 6 containing an urgent specimen is mounted is input, the specimen rack 5 can be input to the analysis devices 2 and 3 regardless of the load information.

FIGS. 9 to 11 are diagrams illustrating simulation results of the specimen transportation process in the automatic analysis device to which the invention is applied. FIGS. 9 to 11 illustrate the simulation results in the automatic analysis device to which two analysis devices including a first analysis device and a second analysis device are connected.

FIG. 9 illustrates the simulation result in a case where a rack stands by for re-analysis in the specimen rack buffer unit 10 and a re-analysis request is not given.

Focusing on a specimen rack of Rack No. 1 in FIG. 9, the transportation starts at the same time as START (on the time axis, 0). The input specimen rack is transported to the first analysis device, analysis is performed. After the measurement in the first analysis device ends, the specimen rack is to be transported to the second analysis device. However, the specimen rack stands by because analysis is being performed in the second analysis device. After the analysis of Rack No. 2 ends, Rack No. 1 is transported to the second analysis device, and the analysis is performed. After the analysis ends, Rack No. 1 stands by for a reaction time and, unless a re-analysis request is given, is collected. Specimen racks after Racks No. 3 are transported to the analysis devices while the time axis is shifted stepwise according to the load states of the analysis devices. That is, since the loads of the two analysis devices increase, the input of the specimen racks is disallowed. As analysis processes (dispensing processes) of the two analysis devices progress, the loads gradually decrease, and the input of the specimen racks is performed at a given timing.

FIG. 10 illustrates the simulation result in a case where a rack stands by for re-analysis in the specimen rack buffer unit 10 and a re-analysis request is given.

FIG. 11 illustrates the simulation result in a case where an urgent specimen is input as a specimen rack of Rack No. 4.

When Rack No. 3 is transported to the first analysis device, Rack No. 4 interrupts such that an analysis process thereof immediately starts.

The invention is not limited to the embodiment and includes various modification examples. For example, the embodiment has been described in detail in order to easily describe the invention, and the invention is not necessarily to include all the configurations described above. Some or all of the above-described respective configurations, functions, and the like may be realized, for example, by designing an integrated circuit. The respective configurations, functions, and the like may be realized by software by a processor interpreting and executing a program that realizes each of the functions.

REFERENCE SIGNS LIST

1: sampler device
2, 3: analysis device
4: control device
5: specimen rack
6: specimen container
10: specimen rack buffer unit
11: specimen rack storage unit
12: specimen rack input unit
13: urgent specimen rack input unit
14: specimen rack transportation unit
15: specimen barcode reader
16: urgent specimen rack detection sensor
17: specimen presence/absence determination sensor
21, 31: analysis device specimen rack pulling-in line
22, 32: specimen dispensing mechanism
32: specimen dispensing mechanism
41: display unit
42: storage unit
43: input unit
44: number-of-requested-items calculation unit
45: load information calculation unit
46: load information comparison unit
51, 61: barcode
100: automatic analysis device
101: specimen rack holding unit
410: input-allowance setting screen
411: load factor input unit
412: load factor input unit
413: input-allowance value input unit
414: input-allowance value input unit
415: CLOSE button

The invention claimed is:
1. An automatic analysis device comprising:
a specimen rack input unit configured to hold one or more specimen racks on which one or more specimen containers each containing a specimen as an analysis target are mounted;
two or more analysis units configured to analyze the specimen contained in each of the one or more specimen containers;
a specimen rack transportation unit configured to transport the one or more specimen racks between the specimen rack input unit and the two or more analysis units;

a specimen rack buffer unit configured to hold the one or more specimen racks transported from the specimen rack input unit until being transported to the two or more analysis units, the specimen rack buffer unit being disposed at a longitudinal end of the specimen rack transportation unit and between two of the two or more analysis units; and a control unit configured to control the automatic analysis device such that load information as information representing an operation status of the two or more analysis units is acquired individually for each of the two or more analysis units, and control the transportation of each of the one or more specimen racks from the specimen rack input unit to the two or more analysis units to stop such that each of the one or more specimen racks is not carried out to the specimen rack buffer unit in a case where the load information of at least one of the two or more analysis units is greater than a predetermined set value, wherein the load information of each of the two or more analysis units is obtained by the product of the number of analysis items, which correspond to non-processed dispensing processes among dispensing processes corresponding to predetermined analysis items with respect to the one or more specimen containers mounted on the one or more specimen racks transported to the two or more analysis units, and a load factor, which represents a time required for a dispensing process by a specimen dispensing mechanism of the two or more analysis units.

2. The automatic analysis device according to claim 1, wherein the control unit includes a number-of-requested-items calculation unit configured to acquire the number of analysis items which is predetermined for the one or more specimen containers mounted on the one or more specimen racks transported to the two or more analysis units, a load information calculation unit configured to calculate the number of analysis items corresponding to non-processed dispensing processes among the number of analysis items obtained by the number-of-requested-items calculation unit, and the load information, and a load information comparison unit configured to compare the load information obtained by the load information calculation unit with the predetermined set value.

3. The automatic analysis device according to claim 1, further comprising:

an urgent specimen rack input unit configured to input a specimen rack on which a specimen container containing an urgent specimen is mounted, wherein the control unit is configured to control the automatic analysis device such that the specimen rack input to the urgent specimen rack input unit is transported from the urgent specimen rack input unit to one of the two or more analysis units regardless of the magnitude between the predetermined set value and the load information.

* * * * *